Feb. 25, 1969

R. W. PABICH ET AL 3,429,013

WING HEADED FASTENER AND METHOD FOR APPLYING

Filed Nov. 24, 1967

INVENTOR
RICHARD W. PABICH
RICHARD W. TREIBER
BY
*Irwin C. Alter*
ATTORNEY

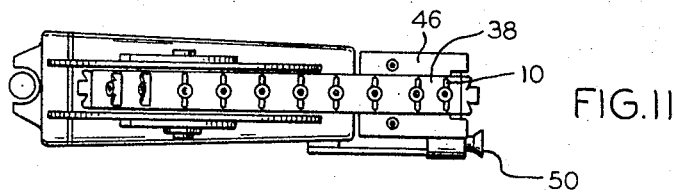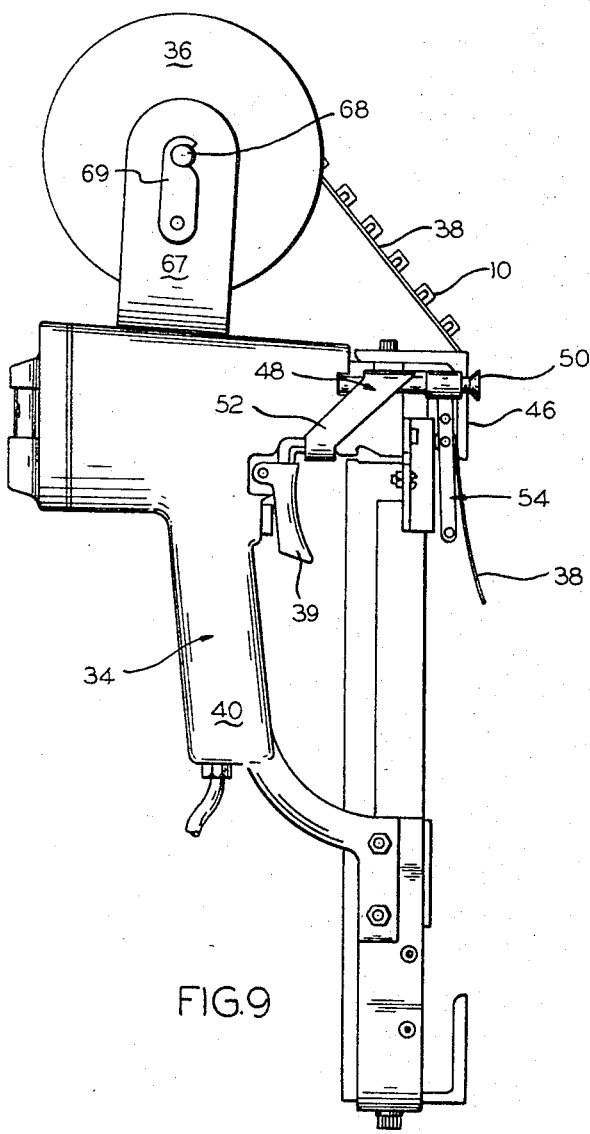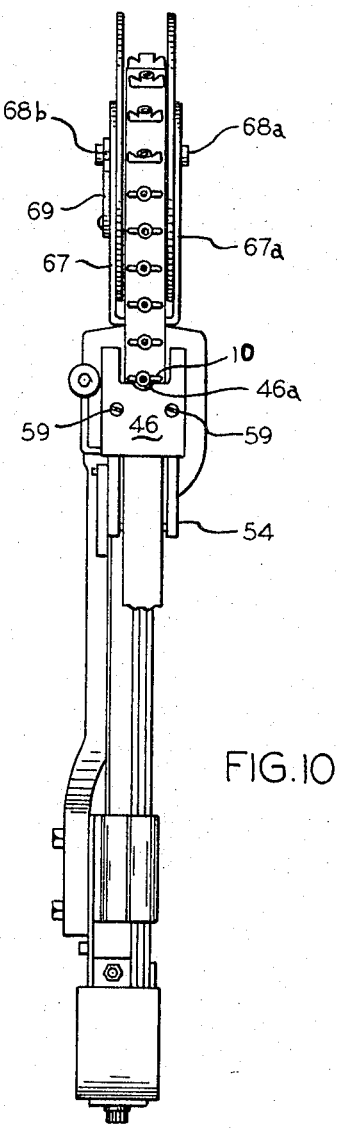

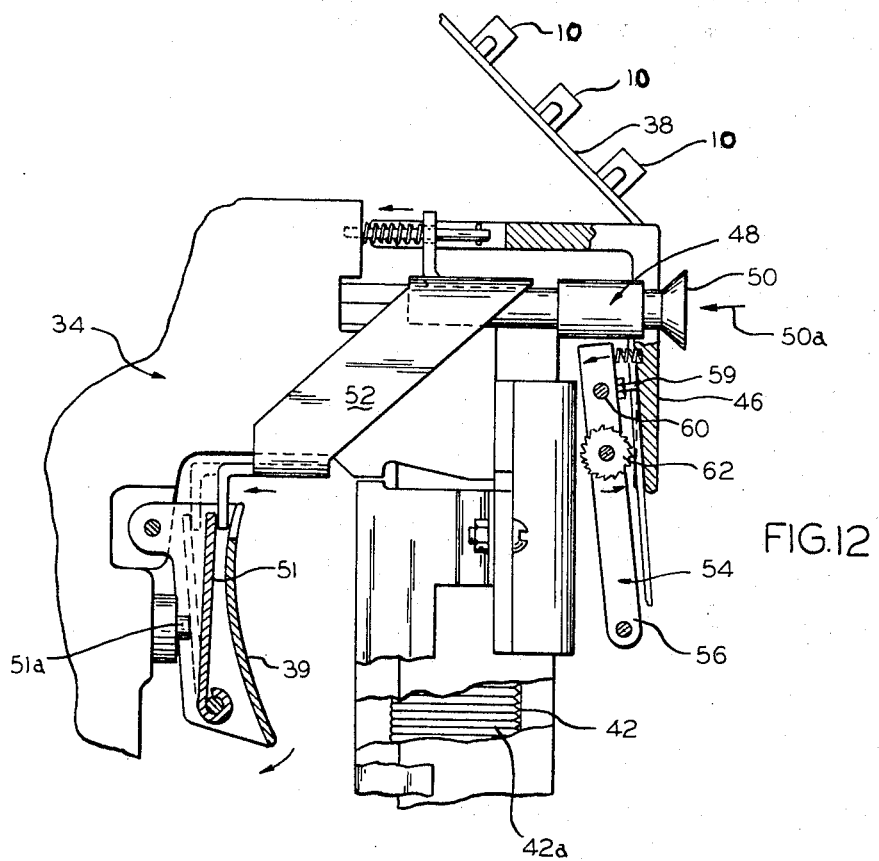
FIG.12
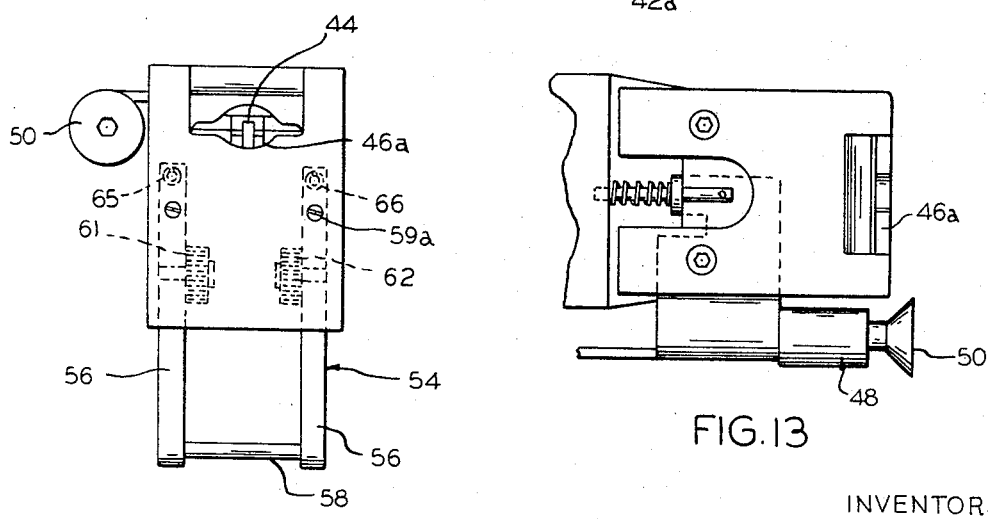
FIG.14
FIG.13
INVENTORS
RICHARD W. PABICH
RICHARD W. TREIBER
BY *Alter and Weiss*
ATTORNEYS United States Patent Office 3,429,013
Patented Feb. 25, 1969

3,429,013
WING HEADED FASTENER AND
METHOD FOR APPLYING
Richard W. Pabich and Richard W. Treiber, Chicago, Ill.,
assignors to Acme Lane Company, Chicago, Ill.
Continuation-in-part of application Ser. No. 615,830,
Feb. 13, 1967. This application Nov. 24, 1967, Ser.
No. 689,939
U.S. Cl. 24—221                           16 Claims
Int. Cl. B27f 7/00; F16b 1/00; B25c 1/04

ABSTRACT OF THE DISCLOSURE

Uniquely formed wing headed fasteners that are adapted to be pivotally mounted to certain members with the nails from a tool for releasably holding a first member, such as a cabinet backing in a position relative to a second member such as a cabinet frame therebehind. The cabinet backing has a key slot formed therein and the wing headed fastener is pivotally mounted with respect thereto by a nail from the tool so that it can removably secure the cabinet backing when its wing portions contact the cabinet backing and release the cabinet backing when the fastener is rotated and the wing portions thereof are in alignment with the key slot and therefore no longer securing or contacting the cabinet backing. The fasteners in one embodiment of the invention are removably fastened to a flexible member such as a tape so that they can be positioned for rapid mounting.

This invention relates to improved wing headed fasteners, and to the method of applying the wing headed fasteners with a minimum of cost and time. This is a continuation in part of our previously filed and pending patent application entitled Improved Wing Headed Fastener and Tool attachment for Applying Fastener, Ser. No. 615,830, filing date Feb. 13, 1967, said application being abandoned since the filing date of this application.

For many years the electronics industry, among others, has been faced with the problem of reassembling imperfect units such as television sets after the same have been assembled. Of principal concern is the necessity of removing and thereafter replacing threaded fasteners which are normally used in fastening the backing members of television cabinets or the like. The cost involved in the operations adds considerably to the unit cost of the product being manufactured and thus there is a definite need for obviating the removal and replacement of the threaded fasteners.

Several attempts have been made in the past to remedy this problem by using fasteners which do not have to be removed from the cabinet in order to enable removal of the cabinet backings which they secure. Such fasteners do exist and although they obviate problems of removal, it is more difficult to install these new fasteners than it is to install the old and well known threaded fasteners.

We have obviated the disadvantages attendant with utilizing common threaded fasteners for securing first members, such as cabinet backing members, to second members, such as cabinets, by providing fasteners which enable the backing of a cabinet to be removed expeditiously without removal of the fasteners. In addition, the fasteners can be positioned and applied automatically with our new process thereby obviating the difficulties involved with initially applying or installing the fasteners.

It is thus a primary object of this invention to provide new and improved fasteners which can removably associate a cabinet backing or the like with a cabinet so that the backing can be assembled and disassembled with a minimum of amount of time and effort.

It is a further object of this invention to provide new and improved fasteners that removably associate a cabinet backing or the like with a second member such as a cabinet in order that the backing can be removed from the cabinet without removal of said fastener.

It is even a still further object of this invention to provide a new and improved process for applying fasteners such as herein described to achieve removable fastening of one member such as a backing to another member.

It is even still further an object of this invention to provide a new and improved system for positioning fasteners such as described herein with respect to nail driving tools in order to associate the fasteners with members by driving nails therethrough.

Other and further objects of this invention will become readily apparent from reading the description in light of the accompanying drawings wherein:

FIGURE 9 is a side elevational view illustrating another embodiment of our invention with an automatic nailing tool where the improved fastener is illustrated as mounted in spaced apart relationship on a carrier tape;

FIGURE 10 is an end view of FIG. 9;

FIGURE 11 is a top view of FIG. 9;

FIGURE 12 is an enlarged side elevational view of the improved tool attachment used to cooperate with the carrier tape and fasteners illustrated in FIG. 9;

FIGURE 13 is a fragmentary elevational view of our device illustrating a spring biased catch that prevents nails from being actuated from the device until after the fastener is properly positioned in a key slot; and FIGURE 14 is an enlarged bottom view of the attachment for the embodiment illustrated in FIG. 9.

Figure 2:
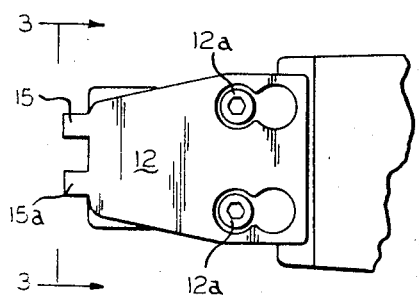
FIGURE 2 is a front view of a tool attachment associated with the automatic nailing tool of FIGURE 1.

Referring to the drawings wherein like characters of reference indicate corresponding parts throughout our new and improved wing headed fastener 10 and a tool attachment 12 which can be used to apply same are shown in FIGS. 1–8 in connection with an air tool which is commonly used for driving nails. Exemplary embodiments thereof have heretofore been illustrated and described in United States Patents Nos. 2,755,475, 2,872,901, 3,081,-740, 3,081,741, 3,081,742, 3,056,964, 3,056,965.

Figure 1:
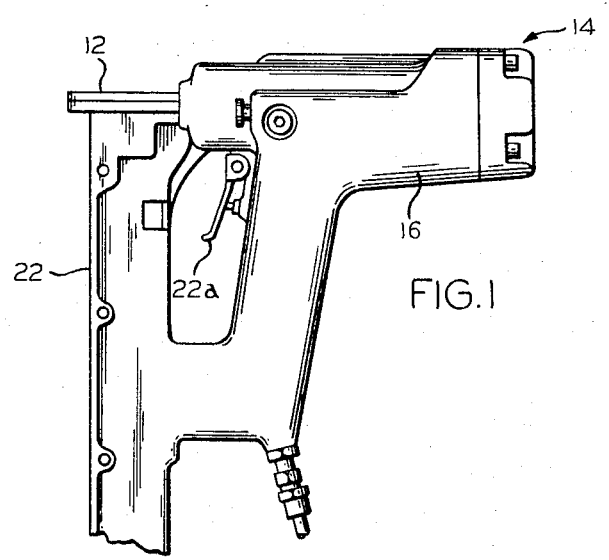
FIGURE 1 is a side elevational view illustrating our invention used with an automatic nailing tool that is powered by compressed air.
Figure 3:
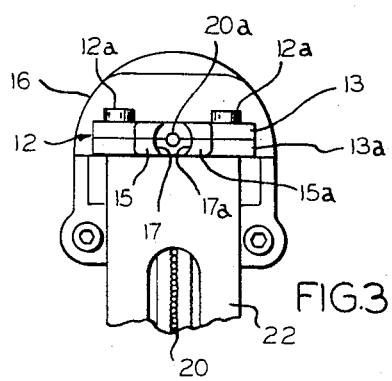
FIGURE 3 is a bottom view looking upward at the tool attachment, of FIG. 2 in relation to the bottom of the automatic nailing tool of FIGURE 1.
Figure 8:
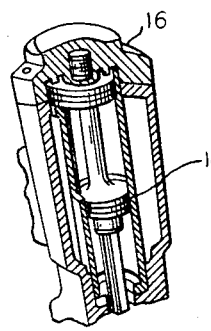
FIGURE 8 is a cut-away view of the actuating piston member of the air tool illustrated in FIGURE 1.

As illustrated in FIGURES 1, 3 and 8, the air tool 14 has a cylinder head 16 that is supplied with compressed air to drive a reciprocating piston 18 in order that nails 20 which are held in the magazine 22 thereof are forced through an aperture 20a in the tool attachment 12. It will be noted that the tool attachment 12 is associated with the lower portion of the air tool 14 by fastening members 12a. The tool attachment 12 comprises a pair of apertured plates 13, 13a. The plates fit together and form the aperture 20a therebetween for purposes of enabling the nails 20 in the magazine 22 to be forced therethrough by the piston 18 upon actuation of the trigger 22a of the air tool 14. The attachment 12 has a pair of spaced apart noses 15, 15a, which have inner sides with opposing arcuate edges 17, 17a to receive and hold the wing headed fasteners 10 in position in connection with the air tool 14 as will be hereafter explained.

Figure 7:
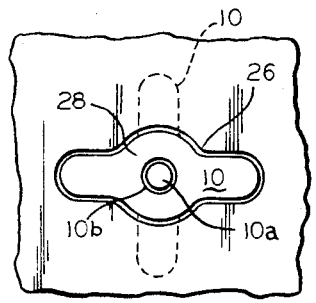
FIGURE 7 is a view illustrating our new and improved wing headed fastener in relation to the key slot in the cabinet backing where the wing headed fastener has an open position (shown by the solid lines) and a closed position (shown in phantom)

The wing headed fasteners 10, as illustrated in FIGURES 4–7, are intended for use in cooperation with a first member, such as a cabinet backing 23 to removably associate the backing with a second member such as a cabinet 24 in order that when it is desired to remove the cabinet backing, the same can be removed without removing the fasteners. The first member or cabinet backing 23 has a key slot 27 which substantially conforms to a cross-section of our new and improved wing headed fastener 10 as illustrated in FIGURE 7.

Figure 6:
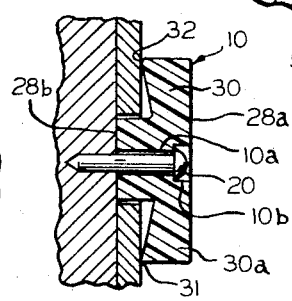
FIGURE 6 is a sectional view similar to FIGURE 4 illustrating how our new and improved wing headed fastener is held in position with the wing head substantially transverse to the key slot with its wing portions forced against the backing surface by a nail.

As illustrated in FIGURES 6 and 7, the wing headed fastener 10 has a central body portion 28 with top and bottom ends 28a, 28b, respectively. A pair of wing portions 30, 30a, project from the central body portion in opposite directions. The wing portions preferably have flat upper ends and inclined lower ends 31, 32 having the lowest points thereof at the outside and rising upwardly at points closer to the central axis thereof. The wing portions 30, 30a are preferably composed of resilient material such as plastic and the lowest points thereof are accordingly deflected upward toward the top end of said wing headed fastener when forced against the cabinet backing 23. Such deflection causes pressure to be exerted on the surface underneath the fastener to secure the fastener and fastened member.

Figure 4:
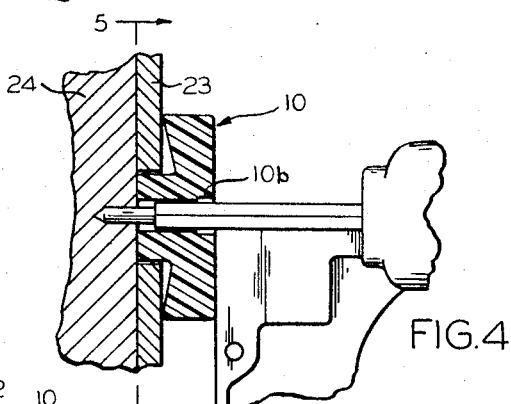
FIGURE 4 is a sectional view illustrating how a nail fastener is forced through one of our new and improved wing headed fasteners to secure the same to a first member such as a cabinet frame.

It will be noted from FIGURES 4 and 6 that the lower ends of the wing portions 30, 30a are rounded so that when it is desired to rotate the fastener, friction is minimized. Also, the central body portion 28 has an opening 10a with a recess 10b formed therein through the central axis thereof from the top to the bottom for receiving a second fastener such as a nail 20 in order that the nail 20 can attach the wing headed fastener 10 to the said second member.

As is apparent from the drawings the fastener 10 when so attached has "open" or "closed" positions. In the closed position the wing headed fastener 10 secures the cabinet backing 23 to the cabinet 24. In the open position the wing headed fastener is rotated to where it is in alignment with the key slot 26, so that the backing is no longer secured to the cabinet as illustrated in FIGURES 5 and 7, and the backing 23 can be removed.

Figure 5:
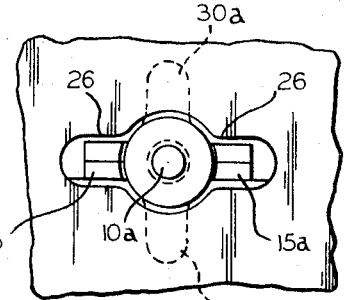
FIGURE 5 is a sectional view taken along a plane passing through the lines 5—5 in FIGURE 4 and looking in the direction of the arrows to illustrate how the new and improved tool attachment of FIG. 2 cooperates with a key slot to locate the wing headed fastener and nail in a certain position relative to said key slot.

In operation, the air tool 14 with its magazine filled with nails 20 has an improved wing headed fastener 10 releasably held by the attachment 12 as illustrated in FIGURE 5. The central body portion 28 of the fastener 10 is held by the arcuate edges 17, 17a, so that the aperture 10a in the wing headed fastener 10 is aligned with the intended path of the nails 20. Thereafter the noses 15, 15a of the tool attachment 12 are positioned in the key slot 26, as illustrated in FIGURE 5 in order that the wing headed fastener has its wing portions 30, 30a positioned substantially transverse to the key slot 26 and therefore in contact with the backing member 23 of the cabinet 24. Thus, when the air tool 14 is actuated a nail 20 is forced through the aperture 20a, the aperture 10a of the wing headed fastener 10 and finally into engagement with the cabinet 24 as illustrated in FIGURES 4 and 6. When a nail 20 is actuated through a wing headed fastener 10 which is releasably held by the attachment 12 it also causes the wing headed fastener to be released from the arcuate edges 17, 17a.

The wing headed fastener's open and closed positions are illustrated in FIGURES 5 and 7. In FIGURE 7, the wing headed fastener is in its open position and is in alignment with the key slot 26 in order that the backing 23 can be removed from the cabinet without removing the fastener 10. The wing headed fastener's closed position is illustrated in phantom in FIGURES 5 and 7 where the wing portions thereof are in contact with the backing of the cabinet in a substantially transverse position with respect to the key slot in order to secure the backing 23 to the cabinet 24. It will be further noted that in order to enable easy rotation of the wing headed fasteners the nails 20 are driven into the cabinet a predetermined distance which gives optimum pressure on the wing headed fastener in addition to allowing selected rotation thereof, when this is desired.

In FIGURES 9 through 14 an automatic nailing tool 34 is illustrated in combination with a roll 36 of flexible carrier strip material, such as the tape 38, that has the wing headed fasteners 10 of this invention mounted thereon in spaced apart relationship. The roll of material 38 enables the wing headed fasteners 10 to be automatically moved to a position where they can be applied rapidly and efficiently as will be explained hereafter.

The nailing tool 34 is patterned after the conventional nailers illustrated in the aforementioned patents and described in connection with FIGS. 1–8. The tool is provided with an actuation trigger 39, a handle 40, a nail clip 42 with nails 42a positioned therein in order that they can be driven through the mouth 44 of the tool. A fastener plate 46 is attached to and positioned on the bottom of the tool 34. The fastener plate 46 has a characterized aperture 46a which is shaped in conformity with the contour of the sides of the wing headed fasteners and is proximately located with respect to the mouth 44 as illustrated in FIG. 10. The aperture 46a works as a locating device for the wing headed fasteners 10 in that the tape 38 is threaded through the aperture 46a from the underside of the plate and pulled over the top of the plate as illustrated in FIGS. 9, 10. The tape can be pulled manually through the aperture 46a and is prevented from being pulled any further when a wing headed fastener is moved against the sides of the aperture 46a.

A safety catch 48 is asociated with the trigger 39 so that the trigger cannot actuate the device unless one of the wing headed fasteners 10 is positioned in the opening of the key slot 26 as illustrated in FIG. 5. The safety catch 48 has a release lever 50 that is depressible to release said trigger 39. The top to bottom dimension of the wing headed fastener 11, if they are not positioned in the cavity, precludes the release lever 50 from being depressed when the fasteners and machine are pressed against a surface unless the wing headed fasteners 10 have their body portions 28 located and positioned within the cylindrical opening in the key slot 26 and against the cabinet or second member 24. As seen from the drawings, the release lever 50 of the safety catch 48 is attached to an arm 52 that is in turn attached to the trigger 39. The arm 52 prevents the trigger from forcing lever 51 against reciprocating piston operating pin 51a unless arm 52 is in its actuated position shown by the broken line drawing of FIG. 12. Thus the trigger 39 will not release compressed air and activate the fasteners unless the release mechanism 50 is actuated upward in the direction shown by arrow 50a by the cabinet backing. Therefore, the tool 34 cannot be operated unless the safety catch has its release lever 50 actuated which occurs only when the wing headed fasteners are properly positioned for being fastened into the key slot as intended.

A pawl mechanism 54, as illustrated in FIGS. 9, 10, 12 and 13 prevents the tape from travelling backward once it is pulled through the aperture 46a. Thus the mechanism 54 operates, to prevent backlash or backward travel of tape 38, after a wing headed fastener 10 has been fastened onto a cabinet.

As illustrated in FIGS. 9, 11, 12 and 14, the pawl mechanism 54 is pivotally mounted above the upper portion of the fastener plate 46 and it includes a pair of spaced apart lever bars 56 which are held together in a spaced apart relationship by means of the transverse bar 58. The mechanism 54 is attached to fastener plate 46 with any well-known threaded fastener such as screws 59, 59a. The screws 59 attach to pivot points 60, which can be cylindrical shafts rotatably mounted in each arm 56. Gripping means such as the gears 61, 62 are rigidly associated with each of the arms 56.

Spring biasing means 65, 66 urge the mechanism 54 with its gears 61, 62 downward into engagement with the tape 38 which is thus held against the fastener plate 46 and prevents back tracking. When it is desired to advance the tape further through the cavity 46a the mechanism 54 is pivoted upward in any well-known manner to its open position against the force of the biasing means 65, 66 in order to preclude the gears 62, 63 from gripping the tape 36.

Any suitable type of bracket can be employed to journal the roll 36. In FIGS. 9 and 10 a pair of brackets 67, 67a can be attached to the nailing tool 34 and the roll 36 can be locked into rotating position by means of a spindle 68 and catch 69. From FIGS. 9 and 10 it is seen that the spindle 68 is shaped like a bolt with a head 68a at one end thereof and a groove 68b at the other end thereof to engage the catch 69. Thus to replace the roll 36 the spindle 68 can be removed by releasing the catch 69, removing the spindle 68, placing a new roll in the device, replacing the spindle in the brackets to journal the new roll and then locking the catch 69 with the groove 68a of the spindle 68. Thus in operation the device illustrated in FIGS. 9 through 13 is operated by first loading the roll of tape with the wing headed fasteners in the machine, then threading a free end of the tape through the aperture 46a and over the fastener plate 46 until the first wing headed fastener is received in the aperture 46a as illustrated in FIG. 10. Then the device 34 is positioned by eye so that the body portion 28 of the wing headed fastener protrudes through the key slot 26 in the cabinet backing 23 with the wing portions 30, 30a thereof in a substantially transverse relationship with the key slot 26 as illustrated in FIGS. 6 and 7. In this position the safety catch 48 is depressed far enough by the pressure from the tool to enable actuation of the trigger 39. After the trigger 39 is actuated, a nail 20 is forced through the mouth 44 of the device as well as through the tape 38 and the opening of the central body portion of the wing headed fastener 10 to thereby affix the wing headed fastener to the cabinet, or the like. Almost any spaced apart relationship between the wing headed fasteners 10 along the tape 38 would be suitable for our invention. The only limitation on the space therebetween is that the wing headed fasteners must be spaced apart a sufficient distance to enable one to be fastened without affecting the next fastener on the tape.

The wing headed fasteners 10 of this embodiment are attached to the tape 38 by means of an adhesive, the adhesive being of a strength that permits the wing headed fasteners 10 to be separated therefrom when a nail is driven therethrough. Still even further relative to the tape roll, in order to separate the wing headed fasteners from the tape by driving nails from the machine, the wing headed fasteners 10 are attached to the tape and rolled in such a manner so that the wing headed fasteners 10 are below the tape when each of them are disposed underneath the mouth 44 of our device and ready for actuation. Thus when a nail is driven through a wing headed fastener 10 the nail pierces the tape 38 and then causes the wing headed fastener 10 to be separated from the tape and fastened in operative position in the key slots 26 of a cabinet backing or the like.

Thus, from an understanding of the operation of our invention, it can be seen that the invention has fulfilled the stated objects in a remarkably unexpected fashion. Not only does the new and improved wing headed fastener enable expeditious removal of the cabinet backings or the like, but also the new and improved attachments and process described herein in connection with the fasteners enable the wing headed fasteners to be installed easily, rapidly and with a minimum of cost.

While we have illustrated preferred embodiments and methods of our invention, the scope thereof is intended to include other embodiments which are suggested by this disclosure. For instance, we contemplate that the wing headed fasteners could have a single wing portion instead of a plurality of wing portions and still be within the purview of this invention. Also, it is conceivable that other shapes of attachments for associating the wing headed fasteners with driving tools could be employed to achieve the objectives herein disclosed and suggested. Still further, it is conceivable that other methods of applying the fasteners could be used with our new and improved fastener notwithstanding the fact that we have found it more expedient to use our new and improved method.

Having thus describd our invention, what we claim and desire to secure by United States Letters Patent is:

1. An improved wing headed fastener that can be used in cooperation with a first member having a key slot formed therein to removably associate said first member with a second member in its closed position, said fastener comprising:

a body portion having atop and a bottom end,
at least one wing portion projecting outwardly from said top end of said body portion,
said body portion having a cross sectional dimension that is free of projections from said wing portion down to said bottom end thereof in order that said body portion can be inserted in said key slot,
said at least one wing portion being resilient and having an under surface with at least a portion thereof that extends further toward the bottom end of said fastener than it does at said body portion so that said at least one wing portion deflects and exerts a holding force on said first member when said body portion is disposed in said slot with said bottom end thereof forced against said second member and said wing headed fastener is in its closed position, and
means for pivotally attaching said wing headed fastener to said second member in a manner that forces said at least one wing portion against said first member to removably secure said first member to said second member when said wing headed fastener is in said closed position,
said fastener being sized to enable removal of said first member from said second member when said fastener is in its open position in registry with said slot,
whereby said wing headed fastener removably secures said first member to said second member by having said wing headed fastener rotatable from said closed position with said at least one wing portion in contact with the surface of said first member to secure same to an open position with said wing headed fastener in registry with said slot.

2. An improved wing headed fastener, as defined in claim 1, wherein a pair of said wing portions project from said body portion that is centrally located.

3. An improved wing headed fastener, as defined in claim 2, wherein said wing portions project from said central body portion in opposite directions, said wing portions having lower ends which have their lowest point at the outside thereof and incline upwardly at points nearer the central body portion.

4. An improved wing headed fastener, as defined in claim 3, wherein said wing portions' lower ends are rounded in order that friction can be minimized when said fastener is rotated.

5. An improved wing headed fastener, as defined in claim 4, wherein said body portion has a second fastener receiving portion therein.

6. An improved wing headed fastener of claim 5, wherein said second fastener receiving portion comprises an aperture extending through said body from the top to the bottom end.

7. The improved wing headed fastener of claim 6, wherein said second fastener receiving portion comprises a nail receiving portion.

8. An improved wing headed fastener, as defined in claim 6, wherein said central body portion includes a recess formed around the top of said aperture to make contact with the head of said second fastener in order that said wing headed fastener can be rotated about said second fastener without being unduly frictionally obstructed by said head.

9. An improved wing headed fastener, as defined in claim 8, said body portion protruding downward a predetermined distance below said wing portions, said body portion being shaped to fit through said key in order that said wing headed fastener can be attached to said second member through said first member with the lower surface of said body portion protruding through said key slot formed in said first member and making contact with said second member, and the lower portions of said wing portions making resilient contact with said first member when said second fastening member protrudes through said aperture and forces said wing headed fastener against said first member.

10. An improved method of removably attaching a panel with at least one slot to a workpiece using a wing headed fastener that includes a body portion;
at least one wing portion projecting outwardly from said body portion,
said at least one wing portion being resilient and being shaped to deflect in the closed position of said fastener and exert a securing force on said panel when said body portion is inserted in said slot and forced against said workpiece, including the steps of:
superimposing said panel onto said workpiece, inserting said body portion of said wing headed fastener in said slot,
pivotally attaching said wing headed fastener to said workpiece in a manner that forces said body portion against said workpiece so that at least one wing portion of said wing headed fastener is deflected and resiliently exerts a force against said panel to secure said panel onto said workpiece when said wing headed fastener is in its closed position.

11. The method of claim 10:
wherein said fastener is held contiguous to said workpiece prior to being pivotally attached thereto.

12. The method of claim 11:
wherein said wing headed fastener is pivotally attached to said workpiece by nailing said fastener to said workpiece.

13. The method of claim 12:
wherein said wing headed fastener is nailed to said workpiece with said at least one wing portion transverse to said slot and abutting said panel.

14. An improved process for attaching a slotted panel having a plurality of slots to a workpiece by means of apertures wing headed fasteners that each have a body portion with at least a pair of wing portions projecting outwardly from said body portion:
said wing portions being resilient and being shaped to deflect and exert a securing force on said panel in the closed position of said fastener when said body portion is inserted in and forced against said workpiece, including the steps of:
superimposing the panel on said workpiece,
passing the body portion of each of said fasteners through each of said slots toward and against said workpiece,
driving second fasteners through said apertures and into said workpiece to rotatably mount said wing headed fastener so that said body portions are forced against said workpiece, and
said wing portions are forced against said panel to secure said panel onto said workpiece when said wing headed fastener is in its closed position not in registry with said slot.

15. An improved process, as defined in claim 14 wherein a plurality of wing headed fasteners are removably attached to a carrier tape, comprising the further steps of: positioning the aperture of one of said wing headed fasteners in alignment with the intended path of said second fastener, and driving said second fastener through said carrier tape and said one wing headed fastener into said workpiece without severing said carrier tape.

16. An improved process, as defined in claim 15, comprising the further step of successively moving said carrier tape (after said second fastener is driven through said carrier tape and a wing headed fastener) to a position where successive wing headed fasteners on said carrier tape can be attached to said workpiece by positioning the aperture of each of said wing headed fasteners in alignment with the intended path of said second fastener.

References Cited

UNITED STATES PATENTS

| 1,251,676 | 1/1918 | McCaffray | 85—1 |
| 2,551,408 | 5/1951 | Amundson | 292—202 |
| 2,716,037 | 8/1955 | Skodnek | 292—60 |
| 2,852,777 | 9/1958 | Cohn | 227—18 |
| 3,123,389 | 3/1964 | Biesecker | 292—218 |
| 394,132 | 12/1888 | Prentice | 24—221 |
| 1,115,489 | 11/1914 | Bennett | 24—221 |
| 1,203,980 | 11/1916 | Clarke | 24—221 |
| 2,229,708 | 1/1941 | Tinnerman | 85—5 |
| 2,456,823 | 12/1948 | Feinstein | 85—5 X |
| 2,867,025 | 1/1959 | Aler | 24—221 |

FOREIGN PATENTS

| 1,260,013 | 3/1961 | France. |
| 115,512 | 11/1900 | Germany. |
| 1,032,624 | 6/1966 | Great Britain. |
| 1,420,494 | 11/1965 | France. |

BERNARD A. GELAK, *Primary Examiner.*

U.S. Cl. X.R.

24—203; 29—432, 434, 464